United States Patent
Aoki et al.

(10) Patent No.: US 12,480,817 B2
(45) Date of Patent: Nov. 25, 2025

(54) STRUCTURE BODY AND ELECTROMAGNETIC WAVE SENSOR

(71) Applicant: TDK CORPORATION, Tokyo (JP)

(72) Inventors: Susumu Aoki, Tokyo (JP); Shinji Hara, Tokyo (JP); Naoki Ohta, Tokyo (JP); Kazuya Maekawa, Tokyo (JP); Maiko Shirokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 640 days.

(21) Appl. No.: 17/890,602

(22) Filed: Aug. 18, 2022

(65) Prior Publication Data

US 2023/0065804 A1 Mar. 2, 2023

(30) Foreign Application Priority Data

Aug. 30, 2021 (JP) .................... 2021-139789

(51) Int. Cl.
*G01J 5/20* (2006.01)
*G01J 5/00* (2022.01)

(52) U.S. Cl.
CPC ......... *G01J 5/20* (2013.01); *G01J 2005/0077* (2013.01); *G01J 2005/202* (2013.01)

(58) Field of Classification Search
None
See application file for complete search history.

(56) References Cited

U.S. PATENT DOCUMENTS

| 7,002,153 | B1 | 2/2006 | Gillham et al. |
| 2014/0048708 | A1 | 2/2014 | Ouvrier-Buffet et al. |
| 2016/0356652 | A1* | 12/2016 | Yun ............... G01J 5/0802 |
| 2018/0003622 | A1 | 1/2018 | Fujisawa et al. |
| 2020/0408604 | A1 | 12/2020 | Ohta et al. |

FOREIGN PATENT DOCUMENTS

| WO | 2016/0129293 A1 | 8/2016 |
| WO | 2019/171488 A1 | 9/2019 |

* cited by examiner

*Primary Examiner* — Erica S Lin
(74) *Attorney, Agent, or Firm* — Oliff PLC

(57) ABSTRACT

A structure body includes: an electromagnetic wave detector; and a pair of arm portions that are positioned on both sides with the electromagnetic wave detector interposed therebetween. The electromagnetic wave detector includes a temperature detection element and an electromagnetic wave absorber which covers at least a part of the temperature detection element. Each of the arm portions includes a wiring layer which is in a line shape and electrically connected to the temperature detection element, and protective layers, a part of each of which is disposed on corresponding one of both sides of the wiring layer. The protective layers are made of a material having a lower thermal conductivity than the wiring layer. In a short direction of the protective layers in a plan view, the wiring layer is positioned on an inward side of both end portions of the protective layers in the short direction.

8 Claims, 13 Drawing Sheets

STRUCTURE BODY AND ELECTROMAGNETIC WAVE SENSOR

CROSS-REFERENCES TO RELATED APPLICATIONS

This application relies for priority upon Japanese Patent Application No. 2021-139789, filed on Aug. 30, 2021 the entire content of which is hereby incorporated herein by reference for all purposes as if fully set forth herein.

BACKGROUND

The present disclosure relates to a structure body and an electromagnetic wave sensor.

For example, there is an electromagnetic wave sensor using an electromagnetic wave detector such as a thermistor element (for example, refer to the following Patent Document 1).

The electrical resistance of a thermistor film provided in a thermistor element varies in accordance with a variance in temperature of the thermistor film. In the electromagnetic wave sensor, infrared rays (electromagnetic waves) incident on the thermistor film are absorbed by the thermistor film or materials around the thermistor film so that the temperature of this thermistor film varies. Accordingly, the thermistor element detects infrared rays (electromagnetic waves).

Here, according to the Stefan-Boltzmann law, there is a correlation between the temperature of a measurement object and infrared rays (radiant heat) discharged from this measurement object due to thermal radiation. Therefore, the temperature of a measurement object can be measured in a non-contact manner by detecting infrared rays discharged from the measurement object using a thermistor element.

In addition, in such a thermistor element, thermistor elements are arranged in an array to be applied to an electromagnetic wave sensor such as an infrared image capturing element (infrared image sensor) detecting (capturing an image of) a temperature distribution of a measurement object in a two-dimensional manner.

PATENT DOCUMENTS

[Patent Document 1] PCT International Publication No. WO 2019/171488

SUMMARY

Incidentally, for the electromagnetic wave sensor described above to perform highly accurate sensing, the thermistor element (electromagnetic wave detector) may be thermally insulated from surrounding parts as much as possible. On the other hand, in order to enhance the thermal insulating performance between the thermistor element and surrounding parts thereof, improvement can be achieved by thinning a pair of arm portions connected to the thermistor element so far as possible. However, if the arm portions are thinned, the mechanical strengths of the arm portions deteriorate.

It is desirable to provide a structure body capable of enhancing thermal insulating properties between an electromagnetic wave detector and surrounding parts thereof while mechanical strengths of arm portions are secured, and an electromagnetic wave sensor including such a structure body.

The following means are provided

[1] A structure body including: an electromagnetic wave detector; and a pair of arm portions that are positioned on both sides with the electromagnetic wave detector interposed therebetween, wherein the electromagnetic wave detector includes a temperature detection element and an electromagnetic wave absorber which covers at least a part of the temperature detection element, wherein each of the arm portions includes a wiring layer which is in a line shape and electrically connected to the temperature detection element, and protective layers, a part of each of which is disposed on corresponding one of both sides of the wiring layer, wherein the protective layers are made of a material having a lower thermal conductivity than the wiring layer, and wherein in a short direction of the protective layers in a plan view, the wiring layer is positioned on an inward side of both end portions of the protective layers in the short direction.

[2] An electromagnetic wave sensor including: at least one structure body according to [1] described above.

DETAILED DESCRIPTION

Figure 1:
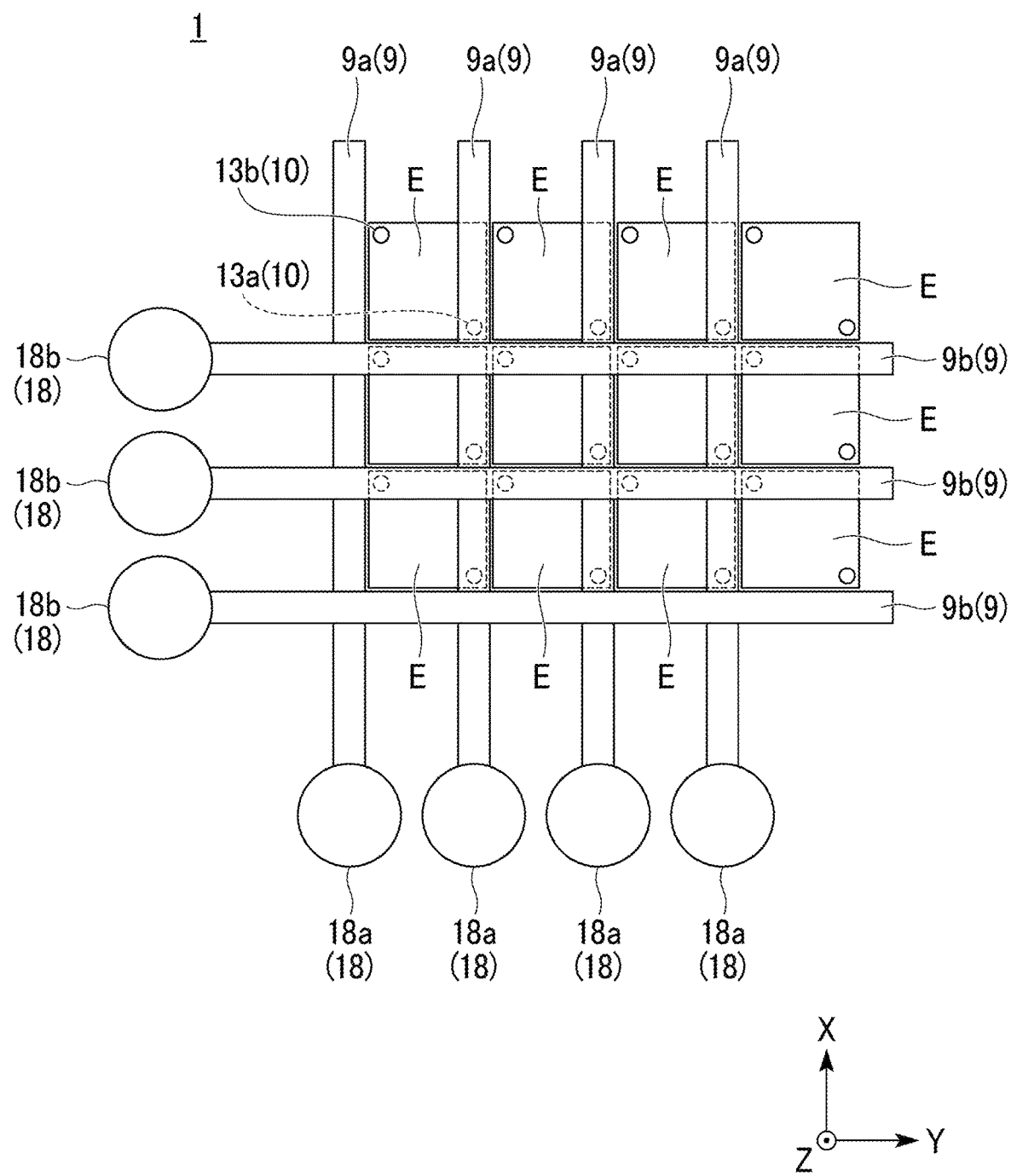
FIG. 1 is a plan view illustrating a constitution of an electromagnetic wave sensor according to an embodiment of the present disclosure.

Hereinafter, an embodiment of the present disclosure will be described in detail with reference to the drawings.

In the drawings used in the following description, in order to make each of constituent elements easier to see, scales of dimensions may differ depending on the constituent element, and it is assumed that dimensional ratios and the like of each of the constituent elements are not always the same as the actual ratios thereof. In addition, materials and the like exemplified in the following description are examples, and the present disclosure is not necessarily limited thereto. The present disclosure can be suitably changed and performed within a range not changing the gist thereof.

In addition, in the following drawings, an XYZ orthogonal coordinate system is set. An X axis direction will be referred to as a first direction X within a particular plane of an electromagnetic wave sensor, a Y axis direction will be referred to as a second direction Y orthogonal to the first direction X within the particular plane of the electromagnetic wave sensor, and a Z axis direction will be referred to as a third direction Z orthogonal to the particular plane of the electromagnetic wave sensor.

As above, according to the present disclosure, it is possible to provide a structure body capable of enhancing thermal insulating properties between an electromagnetic wave detector and surrounding parts thereof while mechanical strengths of arm portions are secured, and an electromagnetic wave sensor including such a structure body.

[Electromagnetic Wave Sensor]

First, regarding the embodiment of the present disclosure, for example, an electromagnetic wave sensor 1 illustrated in FIGS. 1 to 5 will be described.

Figure 2:
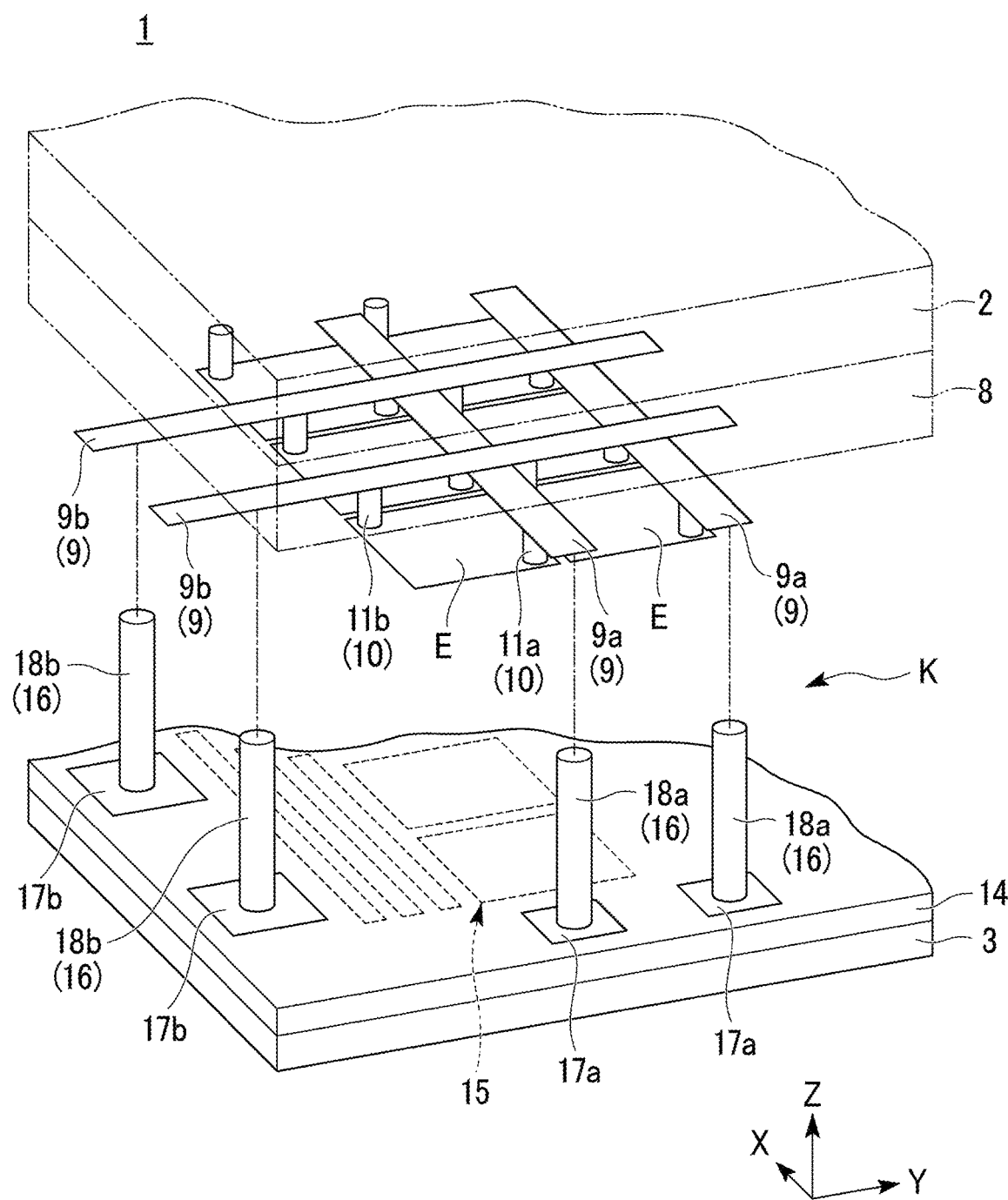
FIG. 2 is an exploded perspective view illustrating a constitution of the electromagnetic wave sensor illustrated in FIG. 1.
Figure 3:
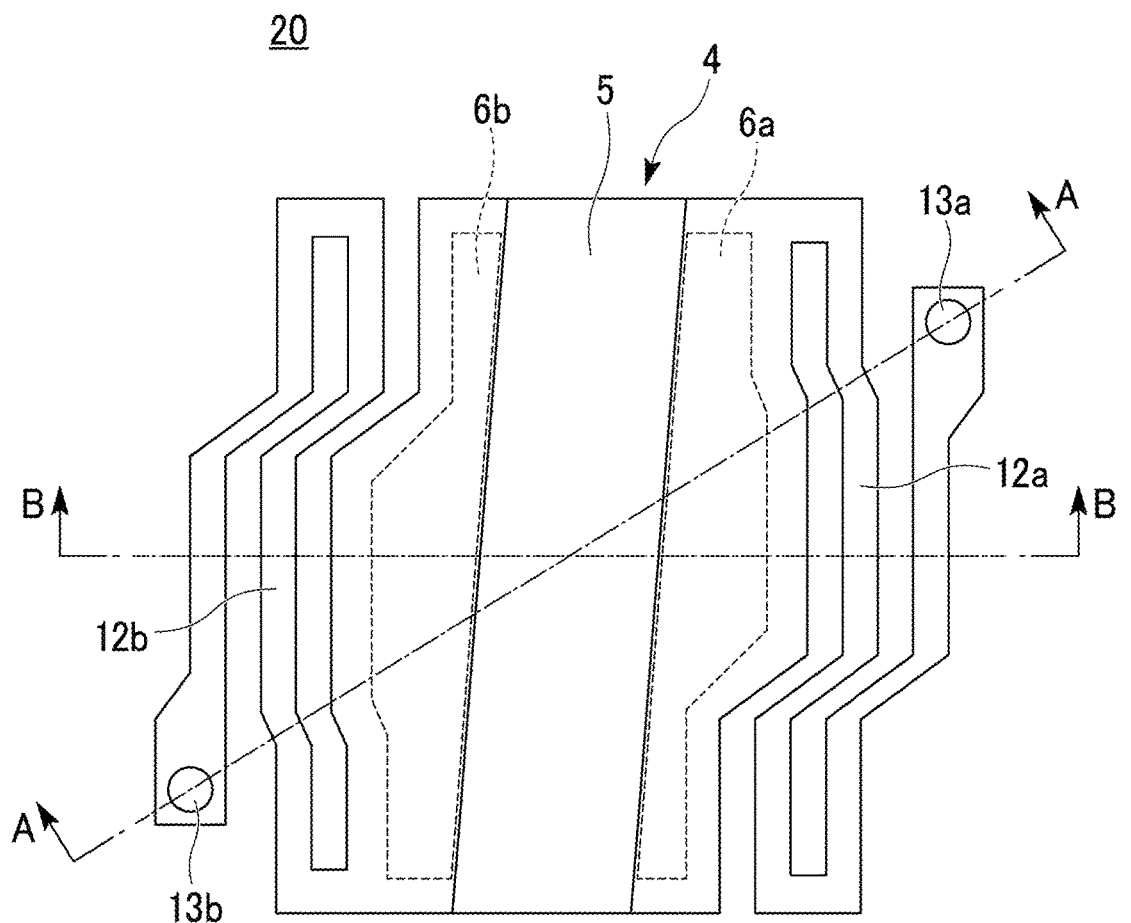
FIG. 3 is a plan view illustrating a constitution of a structure body included in the electromagnetic wave sensor illustrated in FIG. 1.
Figure 3:
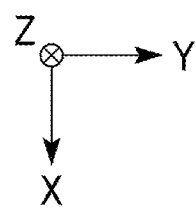
Figure 4:
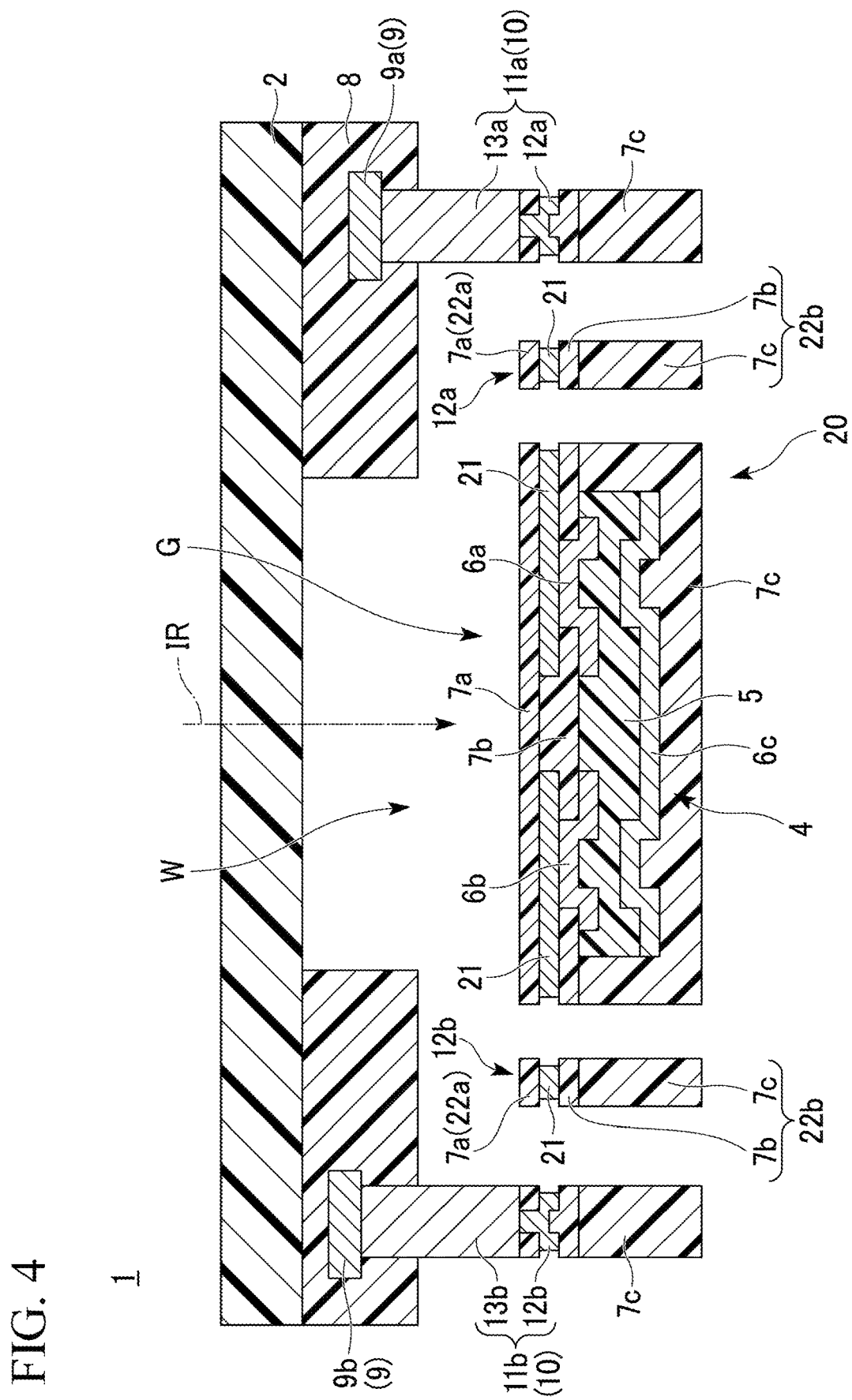
FIG. 4 is a cross-sectional view of the structure body along line segment A-A illustrated in FIG. 3.
Figure 5:
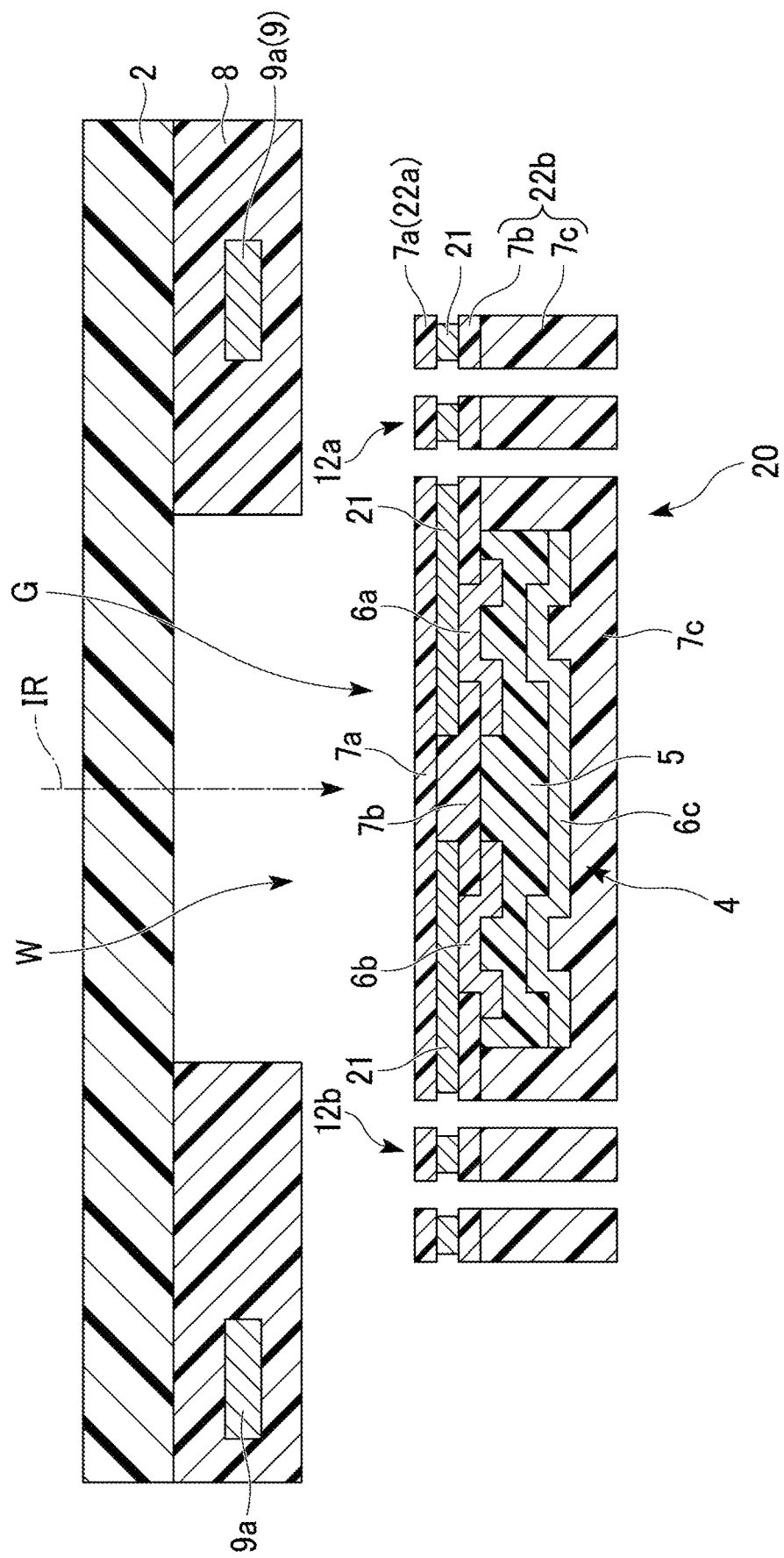
FIG. 5 is a cross-sectional view of the structure body along line segment B-B illustrated in FIG. 3.

FIG. 1 is a plan view illustrating a constitution of the electromagnetic wave sensor 1. FIG. 2 is an exploded perspective view illustrating a constitution of the electromagnetic wave sensor 1. FIG. 3 is a plan view illustrating a constitution of a structure body 20 included in the electromagnetic wave sensor 1. FIG. 4 is a cross-sectional view of the structure body 20 along line segment A-A illustrated in FIG. 3. FIG. 5 is a cross-sectional view of the structure body 20 along line segment B-B illustrated in FIG. 3.

The electromagnetic wave sensor 1 of the present embodiment is a sensor having the present disclosure applied to an infrared image capturing element (infrared image sensor) detecting (capturing an image of) a temperature distribution of a measurement object in a two-dimensional manner by detecting infrared rays (electromagnetic waves) discharged from this measurement object.

Infrared rays are electromagnetic waves having a wavelength within a range of 0.75 µm to 1,000 µm. An infrared image sensor is utilized not only for indoor/outdoor scotopic vision and the like as an infrared camera but is also utilized for temperature measurement and the like of humans and objects as a non-contact-type temperature sensor.

Specifically, as illustrated in FIGS. 1 to 5, this electromagnetic wave sensor 1 includes a first substrate 2 and a second substrate 3 which are disposed such that they face each other, and thermistor elements 4 which are disposed between the First substrate 2 and the second substrate 3.

The first substrate 2 and the second substrate 3 are constituted as silicon substrates having a transparency with respect to electromagnetic waves (which will hereinafter be referred to as "infrared rays") IR having a certain particular wavelength (long-wave infrared rays having a wavelength within a range of 8 to 14 µm, in the present embodiment), in addition, a germanium substrate or the like can be used as a substrate having a transparency with respect to the infrared rays IR.

In the first substrate 2 and the second substrate 3, perimeters of surfaces thereof facing each other are sealed using a seal material (not illustrated) so that a hermetically sealed internal space K is constituted therebetween. In addition, the internal space K is depressurized to a high vacuum state. Accordingly, in the electromagnetic wave sensor 1, an influence of heat due to a convection current in the internal space K is curbed, and an influence by heat other than the infrared rays IR discharged from a measurement object with respect to the thermistor elements 4 is eliminated.

The electromagnetic wave sensor 1 of the present embodiment is not necessarily limited to the constitution in which the hermetically sealed internal space K described above is depressurized, and it may be constituted to have the internal space K which is hermetically sealed or open at atmospheric pressure.

Regarding electromagnetic wave detectors, the thermistor elements 4 include a thermistor film 5 which serves as a temperature detection element, a pair of first electrodes 6a and 6b which are provided such that they conic into contact with one surface of the thermistor film 5, a second electrode 6c which is provided such that it comes into contact with the other surface of the thermistor film 5, and insulating films 7a, 7b, and 7c which serve as electromagnetic wave absorbers covering at least a part of the thermistor film 5 (in its entirety, in the present embodiment). The thermistor elements 4 have a current-perpendicular-to-plane (CPP) structure in which a current flows in a perpendicular-to-plane direction of the thermistor film 5. The insulating film 7b is provided on a side of the pair of first electrodes 6a and 6b opposite to the side in contact with the thermistor film 5.

That is, in this thermistor element 4, a current can flow from the first electrode 6a toward the second electrode 6c in the perpendicular-to-plane direction of the thermistor film 5 and a current can flow from the second electrode 6c toward the first electrode 6b in the perpendicular-to-plane direction of the thermistor film 5.

Regarding the thermistor film 5, for example, oxide having a spinel-type crystal structure including vanadium oxide, amorphous silicon, polycrystalline silicon, and manganese; titanium oxide; yttrium-barium-copper oxide; or the like can be used.

Regarding the first electrodes 6a and 6b and the second electrode 6c, for example, conductive films made of platinum (Pt), gold (Au), palladium (Pd), ruthenium (Ru), silver (Ag), rhodium (Rh), iridium (Ir), osmium (Os), or the like can be used.

Regarding the insulating films 7a, 7b, and 7c, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon bon de, boron nitride, sialon (oxynitride of silicon and aluminum), or the like can be used.

The insulating films 7a, 7b, and 7c need only be constituted to be provided such that at least a part of the thermistor film 5 is covered, in the present embodiment, the insulating films 7a, 7b, and 7c are provided such that both surfaces of the thermistor film 5 are covered.

The thermistor elements 4 are formed to have the same size as each other. In addition, the thermistor elements 4 are arranged in an array within a plane parallel to the first substrate 2 and the second substrate 3 (which will hereinafter be referred to as "within a particular plane"). That is, the thermistor elements 4 are disposed side by side in a matrix in the first direction X and the second direction Y intersecting (orthogonal to, in the present embodiment) each other within the particular plane.

In addition, the thermistor elements 4 are disposed side by side with a uniform gap therebetween in the first direction X and are disposed side by side with a uniform gap therebetween in the second direction Y while having the first direction X as a row direction and having the second direction Y as a column direction.

Examples of the numbers of rows and columns of the foregoing thermistor elements 4 include 640 rows×480 columns and 1,024 rows×768 columns, but the numbers of rows and columns thereof are not necessarily limited thereto and can be suitably changed.

On the first substrate 2 side, a first insulator layer 8, wiring portions 9 which are electrically connected to a circuit portion 15 (which will be described below), and first connection portions 10 which electrically connect each of the thermistor elements 4 and the wiring portions 9 to each other are provided.

The first insulator layer 8 is constituted of an insulating film laminated on a side of one surface of the first substrate 2 (a surface facing the second substrate 3). Regarding the insulating film, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The wiring portions 9 have first lead wirings 9a and second lead wirings 9b. For example, the first lead wirings 9a and the second lead wirings 9b are constituted of conductive films made of copper, gold, or the like.

The first lead wirings 9a and the second lead wirings 9b are positioned inside different layers in the third direction Z of the first insulator layer 8 and are disposed such that they intersect each other in a three-dimensional manner. In these, the first lead wirings 9a extend in the first direction X and are provided side by side with a uniform gap therebetween in the second direction Y. On the other hand, the second lead wirings 9b extend in the second direction Y and are provided side by side with a uniform gap therebetween in the first direction X.

In a plan view, each of the thermistor elements 4 is provided in each region E demarcated by the first lead wirings 9a and the second lead wirings 9b. A window portion W allowing the infrared rays IR to be transmitted therethrough between the first substrate 2 and the thermistor film 5 is present in a region in which the thermistor film 5 and the first substrate 2 face each other in a thickness direction (an overlapping region in a plan view).

In addition, as illustrated in FIGS. 4 and 5, a hole portion 8a penetrating the first insulator layer 8 is provided in a part facing the thermistor element 4. In other words, a hole portion 8a penetrating the first insulator layer 8 is provided between the first substrate 2 and the thermistor element 4.

The first connection portions 10 have a pair of first connection members 11a and 11b which are provided for each of thermistor elements 4. In addition, the pair of first connection members 11a and 11b have a pair of arm portions 12a and 12b and a pair of leg portions 13a and 13b, respectively.

Each of the arm portions 12a and 12b has a wiring layer 21. For example, the wiring layer 21 is formed using a conductor layer made of aluminum, tungsten, titanium, tantalum, titanium nitride, tantalum nitride, chromium nitride, zirconium nitride, or the like. In the examples illustrated in FIGS. 3 to 5, the wiring layer 21 having a bent-line shape is formed along the perimeter of the thermistor element 4. For example, each of the leg portions 13a and 13b is constituted of a conductor pillar having a circular cross section formed to extend in the third direction Z by plating of copper, gold, a FeCoNi alloy, a NiFe alloy (Permalloy), or the like.

The first connection member 11a has the wiring layer 21 which is included in the arm portion 12a electrically connected to the first electrode 6a, and the leg portion 13a which electrically connects the wiring layer 21 included in this arm portion 12a and the first lead wiring 9a to each other, thereby electrically connecting the first electrode 6a and the first lead wiring 9a to each other.

The first connection member 11b has the wiring layer 21 which is included in the arm portion 12b electrically connected to the first electrode 6b, and the leg portion 13b which electrically connects the wiring layer 21 included in this arm portion 12b and the second lead wiring 9b to each other, thereby electrically connecting the first electrode 6b and the second lead wiring 9b to each other.

Accordingly, the thermistor element 4 is supported by the pair of first connection members 11a and 11b positioned in a diagonal direction within the plane thereof in a state of being hung in the third direction Z. In addition, a space U is provided between the thermistor element 4 and the first insulator layer 8.

Although illustration thereof is omitted, selection transistors (not illustrated) for selecting one thermistor element 4 from the thermistor elements 4 are provided on a side of one surface of the first substrate 2 (a surface facing the second substrate 3). Each of the selection transistors is provided at a position of the first substrate 2 corresponding to each of the thermistor elements 4. In addition, each of the selection transistors is provided at a position avoiding the window portion W described above in order to prevent irregular reflection of the infrared rays IR or deterioration in efficiency of incidence.

On the second substrate 3 side, a second insulator layer 14, the circuit portion 15 which detects a variance in voltage output from the thermistor element 4 and converts it into a brightness temperature, and a second connection portion 16 which electrically connects each of the thermistor elements 4 and the circuit portion 15 to each other are provided.

The second insulator layer 14 is constituted of an insulating film laminated on a side of one surface of the second substrate 3 (a surface facing the first substrate 2). Regarding the insulating film, the same insulating film as that exemplified in the foregoing first insulator layer 8 can be used.

The circuit portion 15 is constituted of a read-out integrated circuit (ROIC), a regulator, an analog-to-digital converter (A/D converter), a multiplexer, and the like and is provided inside the second insulator layer 14.

In addition, connection terminals 17a and connection terminals 17b corresponding to the first lead wirings 9a and the second lead wirings 9b, respectively, are provided on a surface of the second insulator layer 14. For example, the connection terminals 17a and 17b are constituted of conductive films made of copper, gold, or the like.

The connection terminals 17a are positioned in a region surrounding the perimeter of the circuit portion 15 on one side in the first direction X and are provided side by side with a uniform gap therebetween in the second direction Y. The connection terminals 17b are positioned in a region surrounding the perimeter of the circuit portion 15 on one side in the second direction Y and are provided side by side with a uniform gap therebetween in the first direction X.

The second connection portion 16 has second connection members 18a and 18b which are provided for the first lead wirings 9a and the second lead wirings 9b, respectively. For example, the second connection members 18a and 18b are constituted of conductor pillars having a circular cross section formed to extend in the third direction Z by plating of copper, gold, or the like.

The second connection members 18a electrically connect one end sides of the first lead wirings 9a and the connection terminals 17a to each other. The second connection members 18b electrically connect one end sides of the second lead wirings 9b and the connection terminals 17b to each other. Accordingly, each of the first lead wirings 9a and the circuit portion 15 are electrically connected to each other via the second connection members 18a and the connection terminals 17a. In addition, the second lead wirings 9b and the circuit portion 15 are electrically connected to each other via the second connection members 18b and the connection terminals 17b.

In the electromagnetic wave sensor 1 of the present embodiment having the foregoing constitution, the infrared rays discharged from a measurement object are incident on the thermistor element 4 from the first substrate 2 side through the window portion W.

In the thermistor element 4, the infrared rays IR incident on the insulating films 7a, 7b, and 7c formed in the vicinity of the thermistor film 5 are absorbed by the insulating films 7a, 7b, and 7c and the infrared rays IR incident on the thermistor film 5 are absorbed by the thermistor film 5 so that the temperature of this thermistor film 5 varies. In addition, in the thermistor element 4, an output voltage between the pair of first electrodes 6a and 6b varies in accordance with a variance in electrical resistance of this thermistor film 5 with respect to the variance in temperature of the thermistor film 5. In the electromagnetic wave sensor 1 of the present embodiment, the thermistor elements 4 function as bolometer elements.

In the electromagnetic wave sensor 1 of the present embodiment, after the infrared rays IR discharged from a measurement object are detected by the thermistor elements 4 in a planar manner, an electrical signal (voltage signal) output from each of the thermistor elements 4 is converted into a brightness temperature so that the temperature distribution of the measurement object (temperature image) can be detected (image-captured) in a two-dimensional manner.

In the thermistor elements 4, when a constant voltage is applied to the thermistor film 5, a variance in current flowing in the thermistor film 5 can also be detected and converted into a brightness temperature with respect to a variance in temperature of this thermistor film 5.

[Structure Body]

Next, regarding the embodiment of the present disclosure, for example, the structure body 20 illustrated in FIGS. 3 to 6 will be described.

Figure 6:
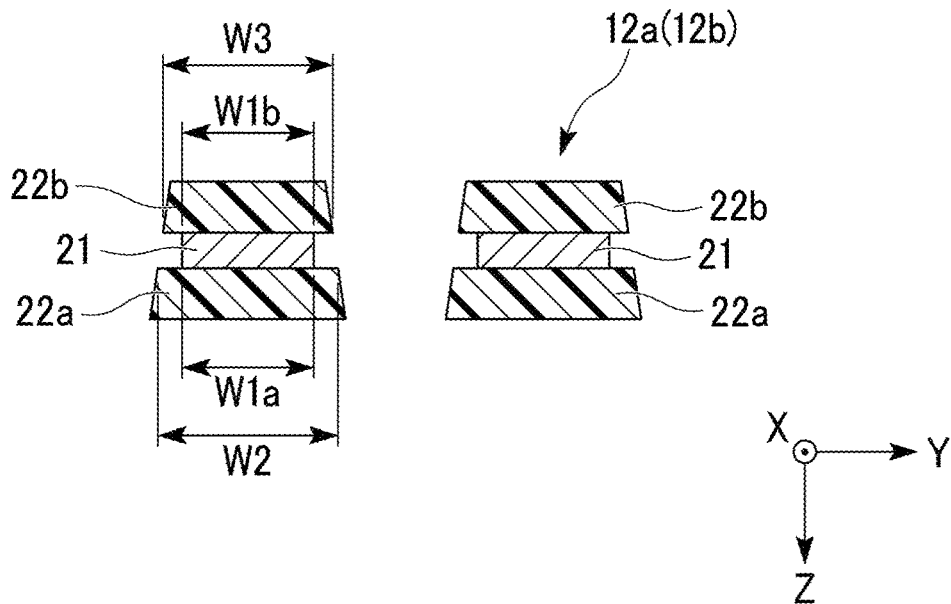
FIG. 6 is an enlarged cross-sectional view of an arm portion included in the structure body illustrated in FIG. 5.

FIG. 6 is an enlarged cross-sectional view of the arm portion 12a or 12b included in the structure body 20.

As illustrated in FIGS. 3 to 6, the structure body 20 of the present embodiment includes the thermistor element 4 which serves as an electromagnetic wave detector, and a pair of arm portions 12a and 12b which are positioned on both sides with the thermistor element 4 interposed therebetween.

Each of the arm portions 12a and 12b has a line shape. Each of the arm portions 12a and 12b has the wiring layer 21 which is in a line shape and electrically connected to the thermistor film 5 provided in the thermistor element 4, and protective layers 22a and 22b, a part of each of which is disposed on corresponding one of both sides of the wiring layer 21. A part of the protective layers 22a and a part of the protective layers 22b are disposed on respective sides of the wiring layer 21 in a thickness direction of the wiring layer 21. The shape of each of the protective layers 22a and 22b is a line shape matching the shape of the wiring layer 21. In addition, the protective layers 22a and 22b are made of a material having a lower thermal conductivity than the wiring layer 21.

The protective layers 22a and 22b are constituted of the insulating films 7a, 7b, and 7c covering the thermistor film 5 described above. In these, the protective layer (which will hereinafter be distinguished as "a first protective layer") 22a disposed on one side of the wiring layer 21 is constituted of the insulating film 7a, and the protective layer (which will hereinafter be distinguished, as "a second protective layer") 22b disposed on the other side of the wiring layer 21 is constituted of the insulating films 7b and 7c. In the following description, as illustrated in FIG. 6, illustration of the insulating films 7a, 7b, and 7c described above is omitted, and they be illustrated as the protective layers 22a and 22b.

The pair of arm portions 12a and 12b are positioned on both sides with the thermistor element 4 interposed therebetween in a plan view. In the example illustrated in FIG. 3, in a plan view, the pair of arm portions 12a and 12b are disposed point-symmetrically with respect to the center of the thermistor element 4. In addition, each of the arm portions 12a and 12b at least has a part extending along the perimeter of the thermistor element 4 and a part coupled to the thermistor element 4.

Specifically, the arm portions 12a and 12b of the present embodiment have a structure in which parts (two parts, in the present embodiment) extending in the first direction X are mainly disposed side by side in the second direction Y and end portions of parts adjacent to each other are coupled via a part extending in the second direction Y. In addition, the pair of arm portions 12a and 12b are coupled to the thermistor element 4 at positions with the thermistor element 4 interposed therebetween via a part extending in the second direction Y.

Incidentally, in the structure body 20 of the present embodiment, in a short direction (the second direction Y in FIG. 6) of the protective layers 22a and 22b in a plan view, the wiring layer 21 is positioned on an inward side of both end portions of the protective layers 22a and 22b in the short direction. In addition, spaces S interposed between the protective layers 22a and 22b are provided on both sides of the wiring layer 21 in the short direction in a plan view.

In addition, in the short direction of the protective layers 22a and 22b in a plan view, both end portions of the second protective layer 22b in the short direction are positioned on an inward side of both end portions of the first protective layer 22a in the short direction. That is, a width W2 in the short direction on a surface of the first protective layer 22a on the wiring layer 21 side is larger than a width W1a in the short direction on a surface of the wiring layer 21 on the first protective layer 22a side, and a width W3 in the short direction on a surface of the second protective layer 22b on the wiring layer 21 side is larger than a width W1b of the wiring layer 21 on the second protective layer 22b side in the short direction. In addition, the width W3 of the second protective layer 22b in the short direction is smaller than the width W2 of the first protective layer 22a in the short direction. The thickness of the first protective layer 22a may be larger than the thickness of the wiring layer 21. The thickness of the second protective layer 22b may be larger than the thickness of the wiring layer 21.

Here, an example of a step of forming the arm portions 12a and 12b will be described with reference to FIGS. 7 to 10. FIGS. 7 to 10 are explanatory cross-sectional views for examples of the step of forming the arm portions 12a and 12b.

Figure 7:
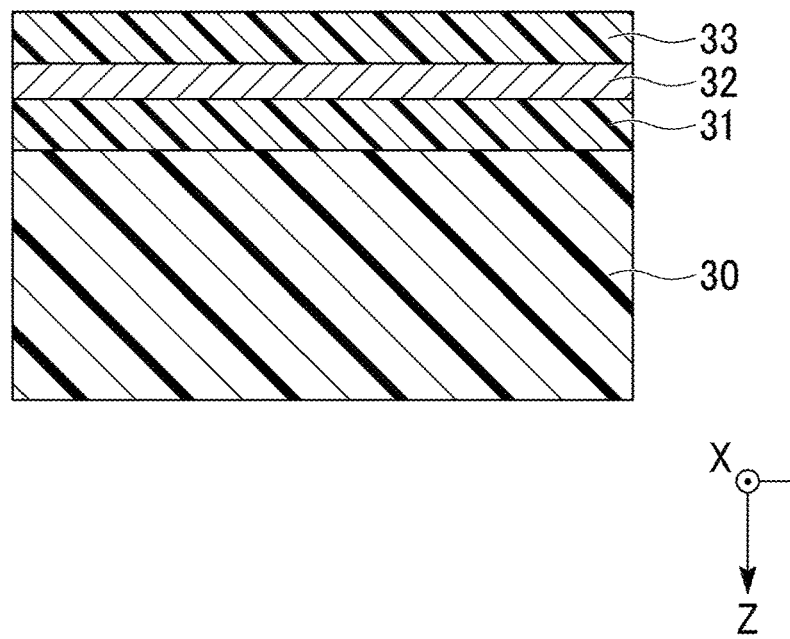
FIG. 7 is an explanatory cross-sectional view for an example of a step of forming the arm portion illustrated in FIG. 6.

In the step of forming the arm portions 12a and 12b, first, as illustrated in FIG. 7, an aluminum oxide ($Al_2O_3$) film 31 which serves as the first protective layer 22a, a titanium (Ti) film 32 which serves as the wiring layer 21, and an aluminum oxide ($Al_2O_3$) film 33 which serves as the second protective layer 22b are sequentially laminated on an organic sacrificial layer 30 which will be ultimately removed by ashing. The thickness of the $Al_2O_3$ film 31 is 2,000 Å, example, and the thickness of the Ti film 32 is 600 Å, for example, and the thickness of the $Al_2O_3$ film 33 is 2,000 Å, for example.

Figure 8:
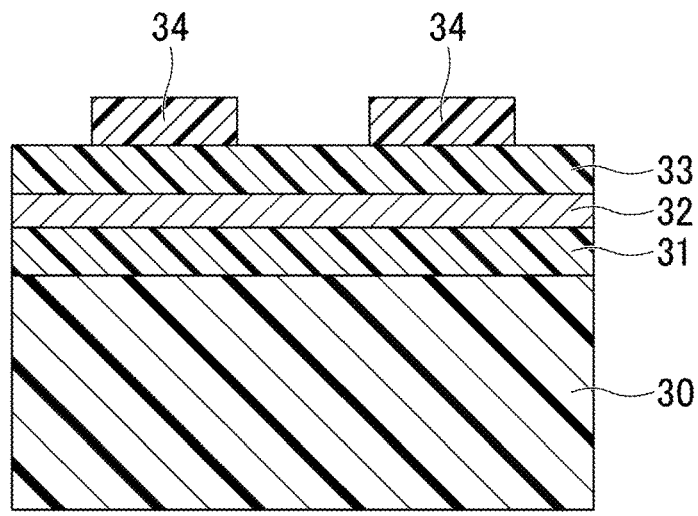
FIG. 8 is an explanatory cross-sectional view for an example of the step of forming the arm portion illustrated in FIG. 6.
Figure 8:
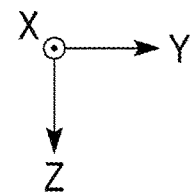

Next, as illustrated in FIG. 8, on the $Al_2O_3$ film 33, after a metal film constituted of a nickel chromium (NiCr) film is formed, a mask layer 34 which is patterned into a shape corresponding to the arm portions 12a and 12b using a photolithography technique is formed.

Figure 9:
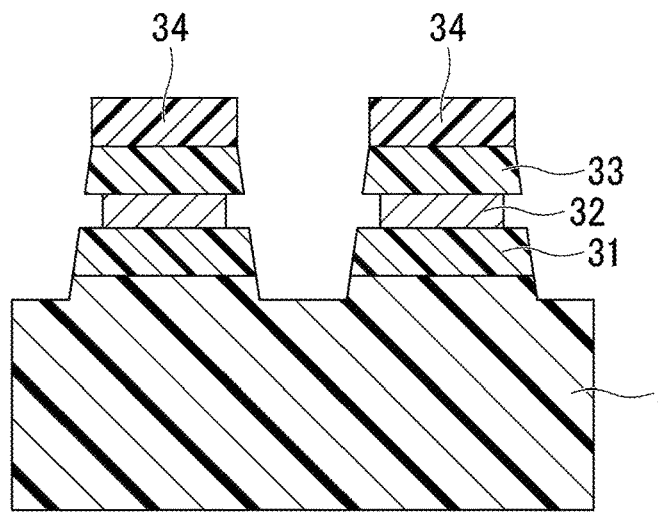
FIG. 9 is an explanatory cross-sectional view for an example of the step of forming the arm portion illustrated in FIG. 6.
Figure 9:
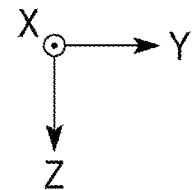

Next, as illustrated in FIG. 9, the $Al_2O_3$ film 33, the Ti film 32, and the $Al_2O_3$ film 31 are patterned into shapes corresponding to the mask layer 34 by reactive ion etching (RIE) using chlorine (Cl) and boron chloride ($BCl_3$) as etching gases.

At this time, the etching rate of each of the materials can be changed by controlling a flow rate of etching gas, an RF power, a pressure, a stage temperature, and the like. For example, when the flow rate of Cl is set to 15 sccm, the flow rate of $BCl_3$ is set to 85 sccm, the RF power is set to 50 W, the pressure is set to 0.3 Pa, and the stage temperature is set to 50° C., the etching rates of the $Al_2O_3$ film 33, the Ti film 32, and the $Al_2O_3$ film 31 can be made equivalent to each other.

In contrast, when the RF power is changed to 25 W, the etching rate of the Ti film 32 in a direction parallel to the film surface becomes higher than the etching rates of the $Al_2O_3$ films 33 and 31 in a direction parallel to the film surface. Accordingly, the Ti film 32 is positioned on an inward side of both end portions of the $Al_2O_3$ films 33 and 31, and both end portions of the arm portions 12a and 12b in the short direction in a plan view can have a recessed shape in which the Ti film 32 is recessed.

Figure 10:
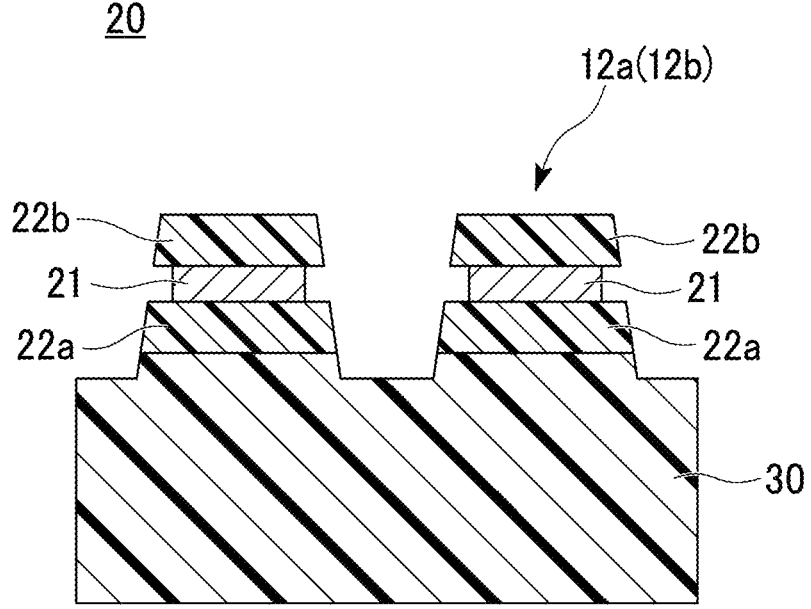
FIG. 10 is an explanatory cross-sectional view for an example of the step of forming the arm portion illustrated in FIG. 6.
Figure 10:
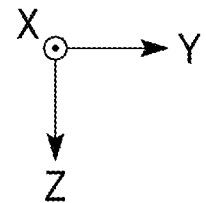

Next, as illustrated in FIG. 10, the mask layer 34 is removed by dry milling. Accordingly, it is possible to form the arm portions 12a, and 12b in which the wiring layer 21 is positioned on an inward side of both end portions of the protective layers 22a and 22b in the short direction.

As above, in the structure body 20 of the present embodiment, it is possible to secure mechanical strengths of the arm portions 12a and 12b due to the protective layers 22a and 22b even when the width of the wiring layer 21 is reduced.

In addition, in the structure body 20 of the present embodiment, the widths W1a and W1b of the wiring layer 21 are smaller than the widths W2 and W3 of the protective layers 22a and 22b, and in the short direction of the protective layers 22a and 22b in a plan view, the wiring layer 21 is positioned on an inward side of both end portions of the protective layers 22a and 22b in the short direction. Therefore, thermal conduction of the arm portions 12a and 12b is curbed, and thermal insulating properties between the thermistor element 4 and surrounding parts thereof become favorable.

Therefore, in the electromagnetic wave sensor 1 including the structure body 20 of the present embodiment, highly accurate sensing by the thermistor element 4 can be performed by enhancing thermal insulating properties between the thermistor element 4 and surrounding parts thereof while mechanical strengths of the arm portions 12a and 12b connected to the thermistor element 4 described above are secured.

In addition, the structure body 20 of the present embodiment is not necessarily limited to the constitution in which spaces S interposed between the protective layers 22a and 22b are provided on both sides of the wiring layer 21 described above in the short direction in a plan view. For example, as in a structure body 20A illustrated in FIG. 11, it may have a constitution in which the second protective layers 22b are provided as side surface protective layers made of a material having a lower thermal conductivity than this wiring layer 21 on both sides of the wiring layer 21 in the short direction (the second direction Y in FIG. 11) in a plan view.

Figure 11:
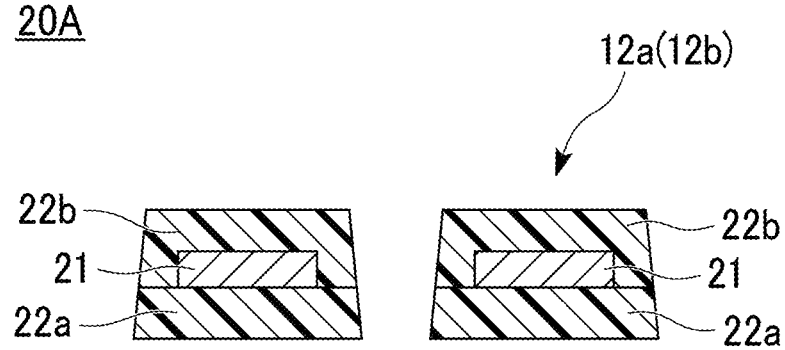
FIG. 11 is a cross-sectional view illustrating another example of a constitution of an arm portion.
Figure 11:
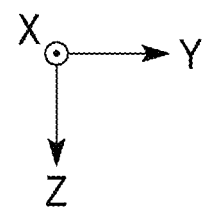

Specifically, in the arm portions 12a and 12b of this structure body 20A illustrated in FIG. 11, the second protective layers 22b are provided on both sides of the wiring layer 21 in the short direction as side surface protective layers. A part of the second protective layer 22b covers both side surfaces of the wiring layer 21 in the short direction and a part of the second protective layer 22b is disposed on one of both sides of the wiring layer 21 in the thickness direction of the wiring layer 21 in FIG. 11.

Here, an example of the step of forming the arm portions 12a and 12b illustrated in FIG. 11 will be described with reference to FIGS. 12 to 17. FIGS. 12 to 17 are explanatory cross-sectional views for examples of the step of forming the arm portions 12a and 12b.

Figure 12:
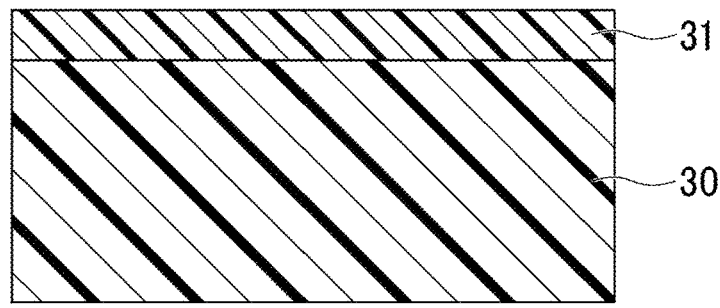
FIG. 12 is an explanatory cross-sectional view for an example of a step of forming the arm portion illustrated in FIG. 11.
Figure 12:
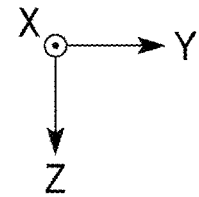

In the step of forming the arm portions 12a and 12b, first, as illustrated in FIG. 12, on the organic sacrificial layer 30, the aluminum oxide ($Al_2O_3$) film 31 which serves as the first protective layer 22a is formed.

Figure 13:
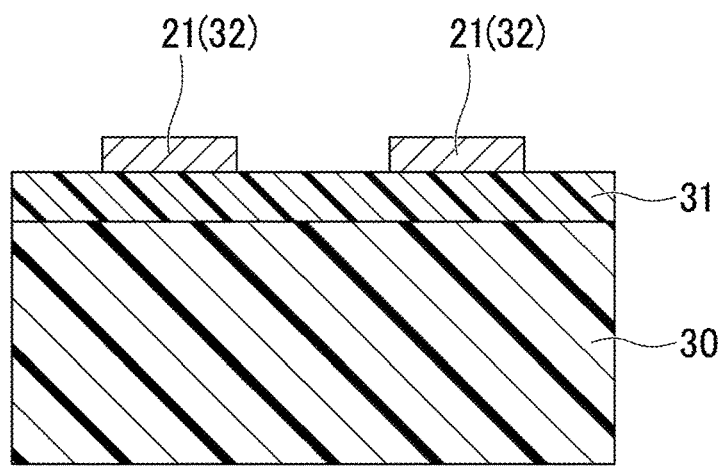
FIG. 13 is an explanatory cross-sectional view for an example of the step of forming the arm portion illustrated in FIG. 11.
Figure 13:
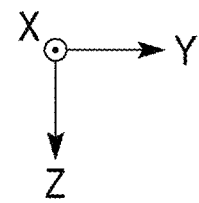

Next, as illustrated in FIG. 13, on the $Al_2O_3$ film 31, after the titanium (Ti) film 32 which serves as the wiring layer 21 is formed, the wiring layer 21 which is patterned into a shape corresponding to the arm portions 12a, and 12b using a photolithography technique is formed.

Figure 14:
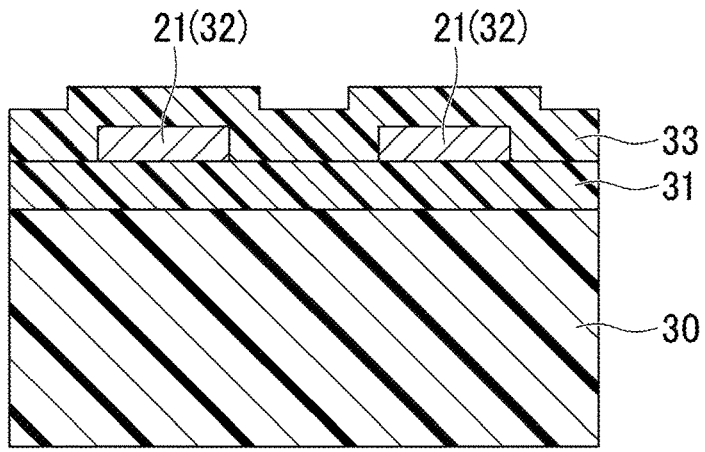
FIG. 14 is an explanatory cross-sectional view for an example of the step of forming the arm portion illustrated in FIG. 11.
Figure 14:
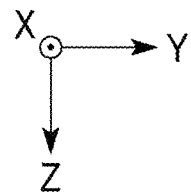

Next, as illustrated in FIG. 14, on the $Al_2O_3$ film 31 in which the wiring layer 21 is formed, the aluminum oxide ($Al_2O_3$) film 33 which serves as the second protective layer 22b is formed.

Figure 15:
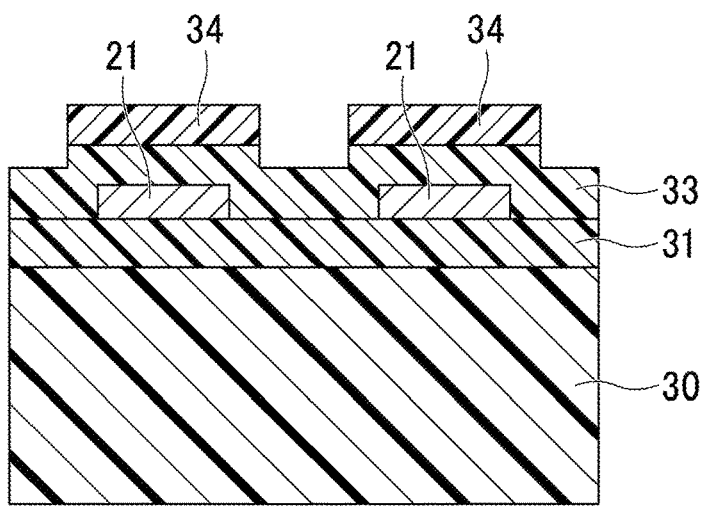
FIG. 15 is an explanatory cross-sectional view for an example of the step of forming the arm portion illustrated in FIG. 11.
Figure 15:
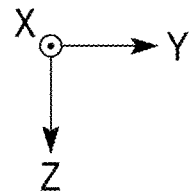

Next, as illustrated in FIG. 15, on the $Al_2O_3$ film 33, after a metal film constituted of a nickel chromium (NiCr) film is formed, the mask layer 34 which is patterned into a shape corresponding to the arm portions 12a and 12b using a photolithography technique is formed. At this time, the width of the mask layer 34 is caused to be larger than the width of the wiring layer 21 so as to correspond to the width of the second protective layer 22b.

Figure 16:
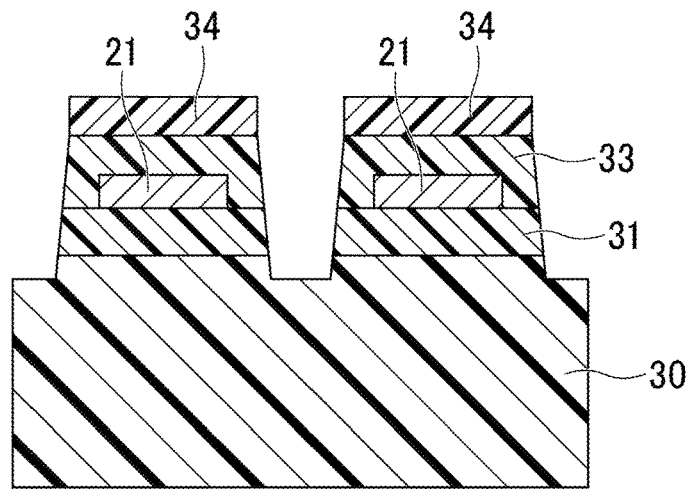
FIG. 16 is an explanatory cross-sectional view for an example of the step of forming the arm portion illustrated in FIG. 11.
Figure 16:
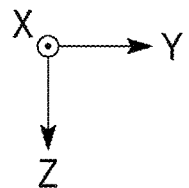

Next, as illustrated in FIG. 16, the Al$_2$O$_3$ film 33 and the Al$_2$O$_3$ film 31 are patterned into shapes corresponding to the mask layer 34 by reactive ion etching (RIE) using chlorine (Cl) and boron chloride (BCl$_3$) as etching gases.

At this time, for example, the Al$_2$O$_3$ film 33 and the Al$_2$O$_3$ film 31 are etched while the flow rate of Cl is set to 15 sccm, the flow rate of BCl$_3$ is set to 85 sccm, the RF power is set to 50 W, the pressure is set to 0.3 Pa, and the stage temperature is set to 50° C.

Figure 17:
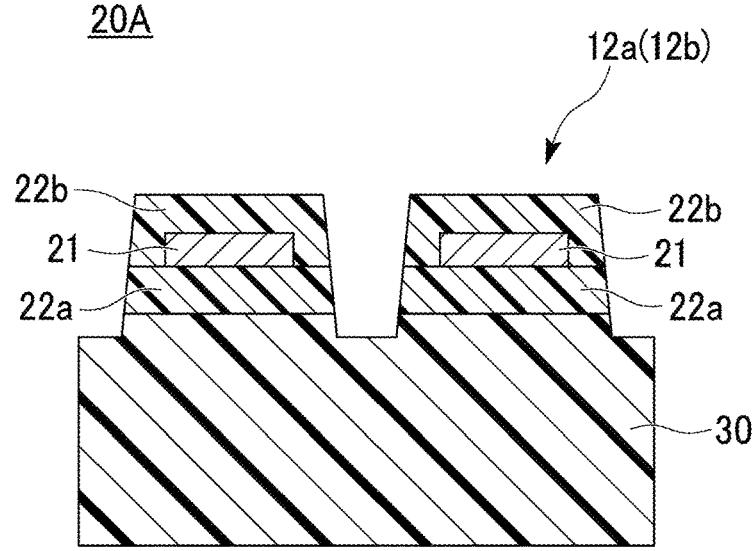
FIG. 17 is an explanatory cross-sectional view for an example of the step of forming the arm portion illustrated in FIG. 11.
Figure 17:
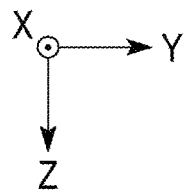

Next, as illustrated in FIG. 17, the mask layer 34 is removed by dry milling. Accordingly, it is possible to form the arm portions 12a, and 12b in which the wiring layer 21 positioned on an inward side of both end portions of the protective layers 22a and 22b in the short direction is covered by the second protective layer 22b which serves as the side surface protective layers.

In the electromagnetic wave sensor 1 including the structure body 20A of the present embodiment, similar to the case of including the foregoing structure body 20, highly accurate sensing by the thermistor element 4 can be performed by enhancing thermal insulating properties between the thermistor element 4 and surrounding parts thereof while mechanical strengths of the arm portions 12a and 12b connected to the thermistor element 4 are secured.

In addition, the electromagnetic wave sensor 1 of the present embodiment is not limited to the constitution including the structure body 20 or 20A described above. For example, it may be constituted to include a structure body 20B or 20C as illustrated in FIG. 18A and FIG. 18B.

Figure 18A:
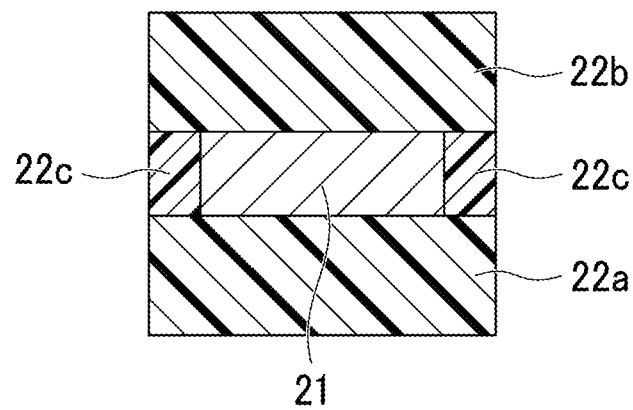
FIG. 18A and FIG. 18B are a cross-sectional view illustrating another example of a constitution of an arm portion.

Specifically, the structure body 20B illustrated in FIG. 18A has a constitution in which side surface protective layers 22c made of a material having a lower thermal conductivity than the wiring layer 21 are provided between the first protective layer 22a and the second protective layer 22b instead of providing the spaces S interposed between the protective layers 22a and 22b on both sides of the wiring layer 21 described above in the short direction. For example, the side surface protective layers 22c may be formed by oxidizing both end portions of the wiring layer 21 in the short direction in a plan view.

Figure 18B:
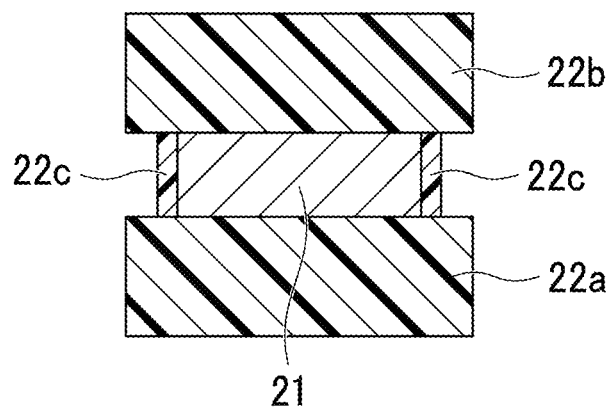
Figure 18B:
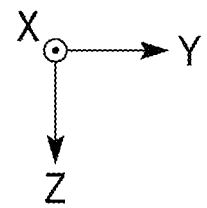

On the other hand, the structure body 20B illustrated in FIG. 18B has a constitution in which the spaces S interposed between the protective layers 22a and 22b are provided on both sides of the wiring layer 21 described above in the short direction in a plan view and the side surface protective layers 22c made of a material having a lower thermal conductivity than the wiring layer 21 are provided between the first protective layer 22a and the second protective layer 22b.

In the electromagnetic wave sensor 1 including the structure body 20B or 20C of the present embodiment, similar to the case of including the foregoing structure body 20, highly accurate sensing by the thermistor element 4 can be performed by enhancing thermal insulating properties between the thermistor element 4 and surrounding parts thereof while mechanical strengths of the arm portions 12a and 12b connected to the thermistor element 4 are secured.

The present disclosure is not necessarily limited to the foregoing embodiment, and various changes can be added within a range not departing from the gist of the present disclosure.

Figure 19:
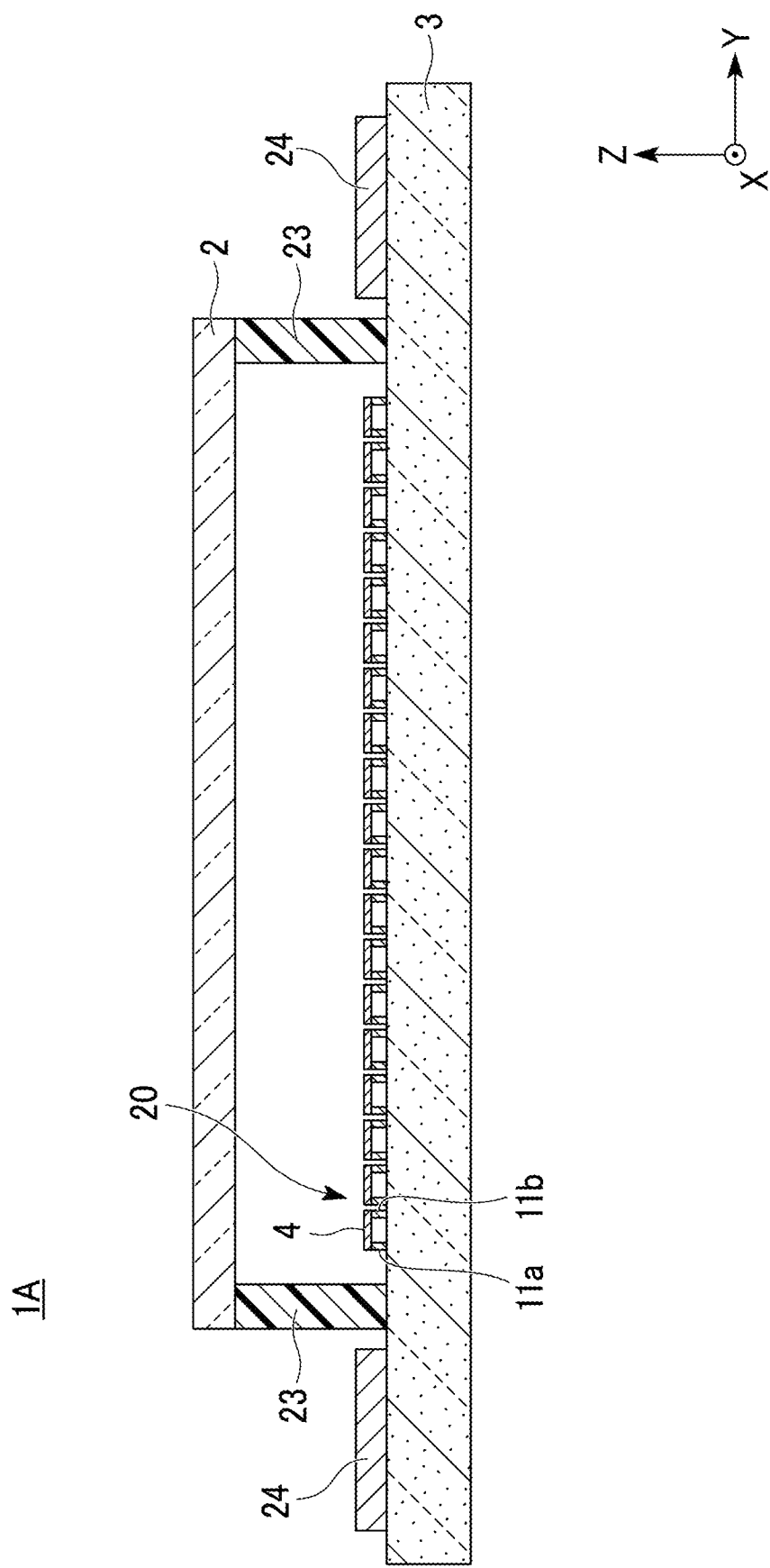
FIG. 19 is a cross-sectional view illustrating another example of a constitution of an electromagnetic wave sensor.

Specifically, in the foregoing embodiment, the hanging-type electromagnetic wave sensor 1 in which the thermistor elements 4 are hung has been exemplified. However, for example, it is also possible to adopt a suspension-type electromagnetic wave sensor 1A in which the thermistor elements 4 illustrated in FIG. 19 are suspended. In the electromagnetic wave sensor 1A illustrated in FIG. 19, description of the same parts as in the foregoing electromagnetic wave sensor 1 is omitted, and the same reference signs are applied thereto in the drawings.

In this case, for example, the first connection members 11a and 11b are directly connected to a read-out circuit (ROIL) provided in the second substrate 3 without using the second connection members 18a and 18b and the wiring portions 9. In the example illustrated in FIG. 19, the thermistor elements 4 are disposed inside a space hermetically sealed by the first substrate 2, a seal member 23, and the second substrate 3, and electrode pads 24 electrically connected to the read-out circuit (ROIC) are disposed outside the space.

The electromagnetic wave sensor having the present disclosure applied thereto is not necessarily limited to the constitution of an infrared image sensor in which the thermistor elements 4 described above are arranged in an array, and the present disclosure can also be applied to an electromagnetic wave sensor in which a single thermistor element 4 is used, an electromagnetic wave sensor in which thermistor elements 4 are arranged side by side in a line shape, and the like. In addition, the thermistor elements 4 can also be used as temperature sensors for measuring a temperature.

In addition, the electromagnetic wave sensor having the present disclosure applied thereto is not necessarily limited to a sensor for detecting infrared rays described above as electromagnetic waves. For example, it may be a sensor for detecting terahertz waves having a wavelength within a range of 30 μm to 3 mm.

In addition, the electromagnetic wave sensor having the present disclosure applied thereto is not necessarily limited to a sensor using the thermistor elements 4 described above as electromagnetic wave detectors. For example, in place of the thermistor film 5, a sensor using a temperature detection element such as a thermopile-type (thermocouple-type), a pyroelectric-type, or a diode-type can be used as an electromagnetic wave detector.

While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A structure body comprising:
   an electromagnetic wave detector; and
   a pair of arm portions that are positioned on both sides with the electromagnetic wave detector interposed therebetween,
   wherein the electromagnetic wave detector includes a temperature detection element and an electromagnetic wave absorber which covers at least a part of the temperature detection element,
   wherein each of the arm portions includes a wiring layer which is in a line shape and electrically connected to the temperature detection element, and protective layers, a part of one of the protective layers being provided on a first side surface of the wiring layer, and a part of another one of the protective layers being provided on a second side surface of the wiring layer that opposes the first side surface, wherein the protective layers are made of a material having a lower thermal conductivity than the wiring layer, and wherein in a short direction of the protective layers in a plan view, both ends of the wiring layer in the short direction are positioned inside of both end portions of the protective layers in the short direction.

2. The structure body according to claim 1, wherein a space interposed between the protective layers on both sides of the wiring layer in the short direction in a plan view is provided.

3. The structure body according to claim 1, wherein side surface protective layers made of a material having a lower thermal conductivity than the wiring layer are provided on both sides of the wiring layer in the short direction in a plan view.

4. The structure body according to claim 1, wherein each of the arm portions at least has a part extending along a perimeter of the electromagnetic wave detector and a part coupled to the electromagnetic wave detector.

5. An electromagnetic wave sensor comprising:

at least one structure body according to claim 1.

6. The electromagnetic wave sensor according to claim 5, wherein the at least one structure body comprises a plurality of structure bodies, and wherein the structure bodies are arranged in an array.

7. The structure body according to claim 2, wherein each of the arm portions at least has a part extending along a perimeter of the electromagnetic wave detector and a part coupled to the electromagnetic wave detector.

8. The structure body according to claim 3, wherein each of the arm portions at least has a part extending along a perimeter of the electromagnetic wave detector and a part coupled to the electromagnetic wave detector.

* * * * *